US010616370B2

(12) United States Patent
Bardhan (10) Patent No.: US 10,616,370 B2
(45) Date of Patent: Apr. 7, 2020

(54) ADJUSTING CLOUD-BASED EXECUTION ENVIRONMENT BY NEURAL NETWORK

(71) Applicant: HEWLETT PACKARD ENTERPRISE DEVELOPMENT LP, Houston, TX (US)

(72) Inventor: Soumendu Bardhan, Tulsa, OK (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 120 days.

(21) Appl. No.: 15/753,964

(22) PCT Filed: Aug. 21, 2015

(86) PCT No.: PCT/US2015/046374
§ 371 (c)(1),
(2) Date: Feb. 20, 2018

(87) PCT Pub. No.: WO2017/034527
PCT Pub. Date: Mar. 2, 2017

(65) Prior Publication Data
US 2018/0241843 A1 Aug. 23, 2018

(51) Int. Cl.
*H04L 29/08* (2006.01)
*G06F 9/50* (2006.01)
(Continued)

(52) U.S. Cl.
CPC ........ *H04L 67/322* (2013.01); *G06F 9/45558* (2013.01); *G06F 9/5066* (2013.01);
(Continued)

(58) Field of Classification Search
CPC . H04L 67/322; H04L 41/5003; G06F 9/5066; G06F 9/45558; G06F 2009/45595; G06N 3/084; G06N 3/02
See application file for complete search history.

(56) References Cited

U.S. PATENT DOCUMENTS 6,411,946 B1 * 6/2002 Chaudhuri ........... G06Q 20/102
705/40
9,218,202 B2 12/2015 Bartfai-Walcott et al.
(Continued)

FOREIGN PATENT DOCUMENTS

WO WO-2014169056 A1 10/2014
WO WO-2015030828 A1 3/2015

OTHER PUBLICATIONS

Di Sanzo P., et al.; "Providing Transaction Class-based Qos in In-memory Data Grids via Machine Learning" ; Feb. 5-7, 2014; 3 pages: http://ieeexplore.ieee.org/xpl/articleDetails.jsp?arnumber=6786762.
(Continued)

*Primary Examiner* — Michael A Keller
(74) *Attorney, Agent, or Firm* — Hewlett Packard Enterprise Patent Department (57) ABSTRACT

Various examples provide for solutions that use an artificial neural network to adjust a cloud-based execution environment for an application based on a set of metrics associated with the cloud-based execution environment, including a Quality-of-Service (QoS) metric and a cost metric. The adjustment may be based on a mapping, determined by the artificial neural network, between the application and a cloud-based infrastructure utilized by the cloud-based execution environment.

20 Claims, 4 Drawing Sheets

(51) Int. Cl.
    G06F 9/455    (2018.01)
    G06N 3/08     (2006.01)
    H04L 12/24    (2006.01)
    G06N 3/02     (2006.01)
(52) U.S. Cl.
    CPC ......... *G06N 3/084* (2013.01); *H04L 41/5003*
        (2013.01); *G06F 2009/45595* (2013.01); *G06N*
                                            *3/02* (2013.01)

(56) References Cited

U.S. PATENT DOCUMENTS

| | | | |
|---|---|---|---|
| 9,264,376 | B2 | 2/2016 | Madduri et al. |
| 10,318,874 | B1* | 6/2019 | Duncan .................... G06N 5/04 |
| 2012/0089726 | A1* | 4/2012 | Doddavula ........... G06F 9/5072 709/224 |
| 2014/0074763 | A1 | 3/2014 | Jeong et al. |
| 2014/0129710 | A1 | 5/2014 | Bartfai-Walcott et al. |
| 2014/0195673 | A1 | 7/2014 | Cook et al. |
| 2015/0088827 | A1* | 3/2015 | Xu ........................ G06F 3/0605 707/634 |
| 2018/0239648 | A1* | 8/2018 | Formanek ........... G06F 9/45558 |

OTHER PUBLICATIONS

Bishop, Christopher M., "Neural Network for pattern recognition", Oxford University Press, 1995, 9 pages (Cover page and preface).
Ahmed Ali-Eldin et al., "Workload Classification for Efficient Auto-Scaling of Cloud Resources," May 21, 2013, pp. 1-36.
Akindele Abisola Bankole, "Cloud Client Prediction Models for Cloud Resource Provisioning in a Muititier Web Application Environment," Apr. 2013, pp. 1-80, Carleton University, Ottawa, Ontario, Canada.
Amazon Web Services, Inc., "importing arid Exporting Instances," Apr. 15, 2015, 1-page [online], Retrieved from the Internet on Jun. 28, 2016 at URL: <web.archive.org/web/20150720064341/http://docs.aws.amazon.com/AWSEC2/latest/UserGuide/instances_of_your_vm.html>.
Anitha N and Anirban Basu, "Neural Network Based Resource Allocation using Run Time Instrumentation with Virtual Machine Migration in Cloud Computing," International Journal of Emerging Science and Engineering, Jan. 2015, pp. 27-29, vol. 3, Issue 3.
Christopher M. Bishop, "Neural Networks for Pattern Recognition: Chapter 4: The Multi-Layer Perceptron," 1995, pp. Title, 116-163, Aston University, Birmingham, United Kingdom.
Diego Didona et al., "Transactional Auto Scaler: Elastic Scaling of Replicated In-Memory Transactional Data Grids," Jan. 2014, pp. 1-40, Technical Report RT/12/2014, Universit'a di Roma, Italy.
Dorian Minarolli and Bernd Freisleben, "Utility-based Resource Allocation for Virtual Machines in Cloud Computing," University of Marburg, Marburg, Germany, 2011, pp. 410-417, IEEE.
Google, "App Engine," Google Cloud Platform, Jul. 23, 2015, pp. 1-5 [online], Retrieved from the Internet on Jun. 28, 2016 at URL: <web.archive.org/web/20150723111944/https://cloud.google.com/appengine/>.
Google, "Google App Engine: Platform as a Service," May 12, 2015, pp. 1-2 [online], Retrieved from the Internet on Jun. 28, 2016 at URL: <web.archive.org/web/20150801005440/https://cloud.google.com/appengine/docs>.
Google, "Integrating with Google Analytics," Feb. 19, 2015, pp. 1-3 [online], Retrieved from the Internet on Jun. 28, 2016 at URL: <web.archive.org/web/20150418181029/https://cloud.google.com/appengine/docs/google-analytics>.
Google, "Managed VMs—Google App Engine—Google Cloud Platform," Mar. 9, 2015, pp. 1-6 [online], Retrieved from the Internet on Jun. 28, 2016 at URL: <web.archive.org/web/20150320101603/https://cloud.google.com/appengine/docs/managed-vms/>.
Google, "Managing App Resources," Sep. 22, 2014, pp. 1-7 [online], Retrieved from the Internet on Jun. 28, 2016 at URL: <web.archive.org/web/20150418183818/https://cloud.google.com/appengine/docs/managing-resources>.
Google, "Overview of App Engine Features," Mar. 5, 2015, pp. 1-17 [online], Retrieved from the Internet on Jun. 28, 2016 at URL: <web.archive.org/web/20150319125307/https://cloud.google.com/appengine/features/>.
Hamoun Ghanbari et al., "Optimal Autoscaling in a IaaS Cloud," Sep. 2012, pp. 1-9, ACM.
International Search Report and Written Opinion, International Application No. PCT/US2015/046374, dated May 20, 2016, pp. 1-10, KIPO.
Jeff Barr, "New—Programmatic Access to AWS Billing Data," Jun. 5, 2016, pp. 1-5 [online], Retrieved from the Internet on Jun. 28, 2016 at URL: <aws.amazon.com/blogs/aws/new-programmatic-access-to-aws-billing-data/>.
Kelly Beardmore, "Automated Anomaly Detection and Optimization in Cloud Computing," Feb. 8, 2012, pp. 1-71 [online], Retrieved from the Internet on Jun. 30, 2015 at URL: <carbon60.com/automated-anomaly-detection-and-optimization-in-cloud-computing>.
Khalid Alhamazani et al., "Cloud Monitoring for Optimizing the QoS of Hosted Applications," Nov. 2012, pp. 765-770, IEEE.
Lars Larsson, "Advanced Predictive and Proactive Auto Scaling," Oct. 13, 2015, pp. 1-6 [online], Retrieved from the Internet on Mar. 29, 2016 at URL: <citycloud.com/advanced-predictive-and-proactive-auto-scaling/>.
Lenar Yazdanov and Christof Fetzer, "VScaler: Autonomic Virtual Machine Scaling," Apr. 30, 2013, pp. 1-8, Technische Universität Dresden, Dresden, Germany.
Leonardo Aniello et al., "An Architecture for Automatic Scaling of Replicated Services," Apr. 23, 2014, pp. 1-15, University of Rome, Rome, Italy.
Md Whaiduzzaman et al., "A Study on Strategic Provisioning of Cloud Computing Services," The Scientific World Journal, Jun. 15, 2014, pp. 1-17, vol. 2014, Article ID 894362, Hindawi Publishing Corporation.
Omid Bushehrian and Zahra Reisi, "iScale: An Intelligent Auto-Scaling Engine for Migrated Applications to the Cloud," ARPN Journal of Systems and Software, Aug. 2014, pp. 116-122, vol. 4, No. 5, AJSS Journal.
Pankaj Deep Kaur and Inderveer Chana, "A Resource Elasticity Framework for QoS-aware Execution of Cloud Applications," Future Generation Computer Systems, Jul. 2014, pp. 14-25, vol. 37, Elsevier B.V.
Paolo Romano et al., "Cloud TM: Transactional, Object-Oriented, Self-Tuning Cloud Data Store," May 2014, pp. 1-20, Technical Report RT/13/2014, INESC ID Lisboa.
Rashid Mijumbi et al., "Neural Network-Based Autonomous Allocation of Resources in Virtual Networks," 2014, pp. 1-6.
Sadeka Islam et al., "Empirical Prediction Models for Adaptive Resource Provisioning in the Cloud," Future Generation Computer Systems, May 8, 2011, pp. 1-22.
Van Tung Tran and Bo-Suk Yang, "Machine Fault Diagnosis and Condition Prognosis using Classification and Regression Trees and Neuro-Fuzzy Inference Systems," Control and Cybernetics, 2010, pp. 25-54, vol. 39, No. 1.
Xabriel J. Collazo-Mojica et al., "Cloud Application Resource Mapping and Scaling Based on Monitoring of Qos Constraints," Jul. 10, 2012, pp. 88-93.
International Preliminary Report on Patentability received for PCT Patent Application No. PCT/US2015/046374, dated Mar. 8, 2018, 8 pages.
Dorian Minarolli, "Utility-based Allocation of Resources to Virtual Machines in Cloud Computing", Philipps-Universitat Marburg, 2014, 183 pages.

* cited by examiner

ADJUSTING CLOUD-BASED EXECUTION ENVIRONMENT BY NEURAL NETWORK

BACKGROUND

In the cloud computing environment, service providers offer infrastructure as a service or utility computing (e.g., Information Technology [IT] resources) to large set of customers with diverse service requirements. To the service provider, the profit is essentially the difference between the price the customer pays to the provider for the service and the operational cost. Oftentimes, the price is defined in the contract between the service provider and the customer and it is typically tied to specific service level agreements (SLAs), which may set the price in the form of a piecewise linear function according to specific levels of service. Generally, an SLA is a contract between a service provider and its customer indicating a level of service agreed upon as well as associated revenue gain or loss. SLAs can be about many aspects of a cloud computing service such as availability, scalability, security, response time (e.g., network latency), physical location, legal, compliance, among others.

BRIEF DESCRIPTION OF THE DRAWINGS

Certain examples are described in the following detailed description in reference to the following drawings.

DETAILED DESCRIPTION

It is a challenge for existing scaling techniques for cloud-based infrastructure to maintain compliance with service level agreements (SLAs) while reducing costs of using the cloud-based infrastructure. Though mapping applications to cloud-based infrastructure can be dynamic, it is difficult to predict temporal variations in client demands of the applications or geographical locations of clients (e.g., where the application is multi-tenant), and preemptively scale cloud-based infrastructure accordingly. Oftentimes, providers of cloud-based infrastructure over-allocate cloud-based resources to each application so that SLA compliance can be maintained, but at the expense of ineffective distribution of available cloud-based resources (e.g., de-allocated cloud-base resources).

Various examples described herein address such challenges and difficulties. In particular, various examples can adjust a cloud-based execution environment (e.g., cloud-based run-time environment) for executing an application to improve for various metrics, including a quality-of-service (QoS) metric (e.g., measured availability over time) and a current cost metric (e.g., cost per minute of use). Additionally, some examples can adjust the cloud-based execution environment based on predicted demand of the application in view of various factors, such as the application's current performance metric, the current date, or the current time.

According to some examples, an artificial neural network (e.g., feedforward neural network) is utilized to adjust a cloud-based execution environment for an application based on a set of metrics associated with the cloud-based execution environment, including a Quality-of-Service (QoS) metric (e.g., measure of availability by percentage), a cost metric (e.g., dollars per minute of use), and a performance metric of the application. Through its input node layer, the artificial neural network can receive as inputs cost associated with the cloud-based execution environment, the QoS associated with the cloud-based execution environment, and the current performance metric of the application as it executes within the cloud-based execution environment. Examples of performance metrics of the application can include, without limitation, response time, queue length, processor utilization, memory utilization, and network utilization. These and other performance metrics may be measured according to time or date. The input node layer may further receive additional factors for scaling, including the current data or the current time of execution of the application. An output node layer of the artificial neutral network can provide information upon which a mapping can be determined between the application and a cloud-based infrastructure utilized by the cloud-based execution environment. Subsequently, the cloud-based execution environment can be adjusted based on the mapping. For instance, where the cloud-based execution environment is implemented on a cloud-based platform (e.g., CLOUD FOUNDRY or GOOGLE App Engine), a cloud manager (e.g., elasticity manager) associated with the cloud-based platform may receive the mapping as data from a database table and in response, adjust cloud-based infrastructure that supports the cloud-based execution environment.

By utilizing a set of metrics that include a Quality-of-Service (QoS) metric and a cost metric, some examples can provide effective allocation and de-allocation of cloud-based infrastructure for use by a component of an application executing within a cloud-based execution environment. For some examples, the QoS metric, the cost metric, and the like can be accurately captured or provided by a service level agreement (SLA) management tool associated with (e.g., that manages) the cloud-based execution environment of the application.

As used herein, the term "cloud-based" can describe a network accessible system or component implemented by combining computing resources (e.g., networks, computer systems, storage, applications, etc.) from a shared pool of computing resources. For instance, a cloud-based system or component described herein may be implemented by a plurality of networked computer systems (e.g., servers) or by a set of virtual machine instances formed by combining computing resources from the shared pool. The shared pool of computing resources may be hosted in a data center and the usage of the shared pool may be shared by a plurality of cloud-based systems or components.

As used herein, a cloud-based infrastructure may include a cloud computing infrastructure-as-a-service (IaaS) or platform-as-a-service (PaaS), such CLOUD FOUNDRY, MICROSOFT AZURE, AMAZON Web Services, GOOGLE App Engine, and the like. For some examples, the cloud-based infrastructure includes an elastic IaaS, PaaS, or both, which permits for a scalable cloud-based execution environment. As used herein, an application can comprise any application that operate in a cloud-based execution environment, including server-based services. Examples of server-based services include, without limitation, web services (e.g., to provide a website, a web-based applications, or a web service), electronic mail (e-mail) service, electronic messaging service (e.g., instant messaging service), a database service, load balancing service, security service, and the like. Such server-based services can involve receiving and servicing requests from clients, which may comprise physical or virtual computing entities (e.g., other cloud-based resources). Additionally, as used herein, a computer system can include, without limitation, a desktop, a server, or a mobile computing device, such as a laptop or tablet.

Various examples described herein utilize an artificial neural network to implement machine learning techniques to progressively learn about a cloud-based execution environment for an application (e.g., web, e-mail, database, or security service) and based on what is learned, improve various metrics of the cloud-based execution environment for the application. The various metrics improved may include a cost metric (e.g., reduce cost of renting a cloud-based server per minute) and a quality-of-service metric (e.g., increase measured availability). Improvement of the cloud-based execution environment may be facilitated by passing adjustments (e.g., parameter adjustments) to the cloud-based execution environment, which may use the adjustments to periodically remap components of the application to cloud-based infrastructure to achieve improved performance and cost reduction. The artificial neural network may utilize a backpropagation algorithm to compute weights for a hidden node layer of the artificial neural network, and employ a gradient decent search function to attempt to reduce the squared error between the output node layer of the artificial neural network and target values for the outputs.

For some examples, the artificial neural network includes an input node layer that receives service level agreement (SLA) metrics (e.g., availability percentage and cost for renting various cloud-based server in the environment) and application execution metrics, such as queue length, processor utilization, memory utilization, and network utilization. For instance, the input node layer may include three input nodes to receive a cost metric, a quality-of-service (QoS) metric, and an application execution metric, respectively. The artificial neural network may further include an output node layer that outputs a mapping of an application to cloud-based infrastructure utilized by the cloud-based execution environment for the application. For instance, the output node layer may include two output nodes to provide the mapping: one to describe a number of virtual machine instances to be used by the cloud-base execution environment; and the other to describe how each virtual machine instance is to be utilized by the cloud-based execution environment. As noted herein, the mapping is intended to reduce certain metrics associated with the cloud-based execution environment, such as cost, and improve others, such as QoS. The artificial neural network may also include at least one hidden node layer that facilitates the operation of the artificial neural network and output by the output node layer. Depending on the example, the hidden node layer may include at least seven hidden nodes.

Depending on the example, the mapping may describe the number of virtual machine instances utilized by the cloud-based execution environment, how each virtual machine instance is to be utilized by the cloud-based execution environment (e.g., primary or secondary web server to provide a web service), a characteristic of each virtual machine instance utilized by the cloud-based execution environment (e.g., number of processor cores, amount of memory, a network parameter, a number logical processors per a network socket, etc.). Using the mapping, the cloud-based execution environment can adjust the cloud-based execution environment, which can involve provisioning/de-provisioning components of the cloud-based execution environment (e.g., virtual machine instances) or re-configuring such components. For various examples, the cloud-based execution environment may be an auto-scaling execution environment (e.g., by CLOUDFOUNDRY), which may periodically resize its configuration and which may decide on replication or migration strategy to fulfill mapping the application to the cloud-based infrastructure.

To train the artificial neural network, a set of inputs and target outputs may be utilized to improve a certain set of metrics associated with the cloud-based execution environment, including cost and quality-of-service (QoS) metrics. In particular examples, k-fold cross-validation is utilized over a set of records that associate metrics of a given cloud-based execution environment with the parameters (e.g., configuration) of that given cloud-based execution environment. In this way, the artificial neural network can train over known parameters for example cloud-based execution environments, where the metrics of those example cloud-based execution environment are known to result from known parameters.

The following provides a detailed description of the examples illustrated by FIGS. 1-4.

Figure 1:
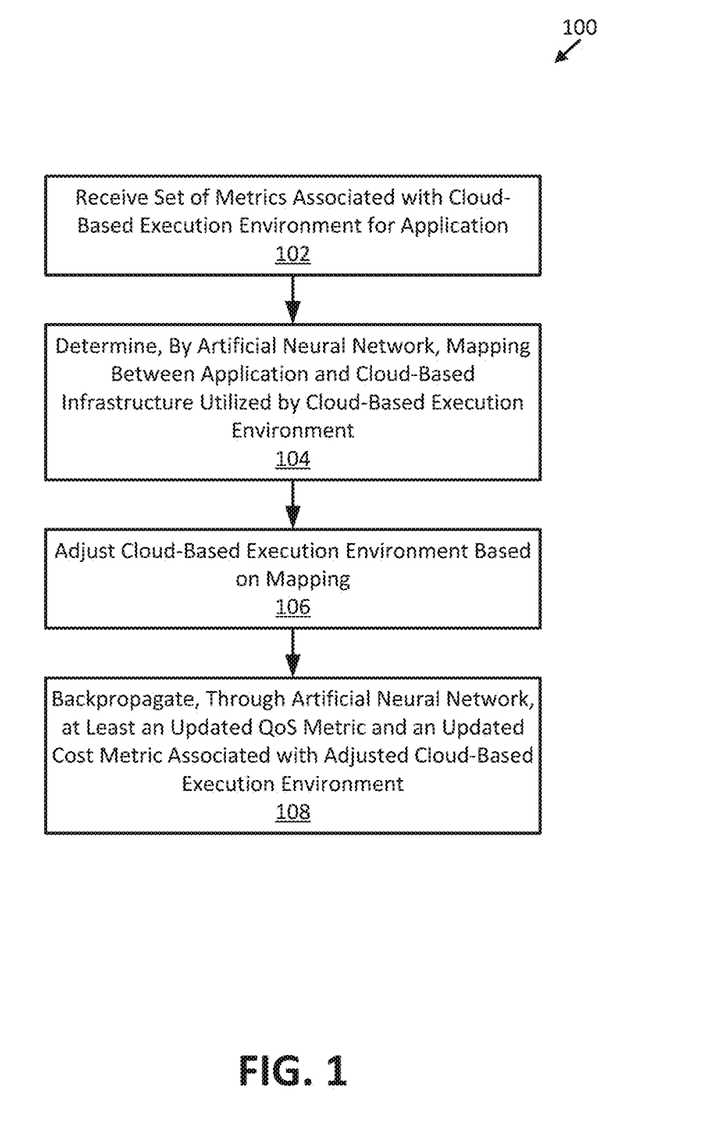
FIGS. 1 and 2 are flowcharts illustrating example methods for adjusting a cloud-based execution environment according to the present disclosure.

FIG. 1 is a flowchart illustrating an example method 100 for adjusting a cloud-based execution environment according to the present disclosure. For some examples, the method 100 may be one performed with respect to a computer system that can access a set of computer systems implementing, supporting, or managing the cloud-based execution environment. For certain examples, the computer system performing the method 100 may be one that includes or can access a service level agreement (SLA) management tool associated with the cloud-based execution environment. Additionally, the method 100 may be implemented as a software application operating on a virtual machine instance supported by a cloud-based platform (e.g., CLOUD FOUNDRY). Depending on the example, the method 100 may be implemented in the form of executable instructions stored on a computer-readable medium or in the form of electronic circuitry, or a combination thereof. For some examples, the operations performed, or the order in which they are performed, may differ from what is illustrated by FIG. 1.

The method 100 may begin at block 102 by a computer system receiving a set of metrics associated with a cloud-based execution environment for executing an application, where the set of metrics includes a quality-of-service (QoS) metric, a cost metric, and a performance metric of the application. Depending on the example, the performance metric of the application includes a response time associated with the application (e.g., generating and sending a response to a client request), a queue length associated with the application (e.g., client request queue), or computer-resource utilization by the application (e.g., percentage of processor, memory, or network utilization) as the application executes within the cloud-based execution environment.

In various examples, the QoS metric, the cost metric, or both may be provided by a service-level agreement (SLA) management tool associated with (e.g., managed by) the cloud-based execution environment. Example SLA management tools can include, without limitation, HP Universal Configuration Management Database (CMDB) and the like. The metric data maintained by the SLA management tool, such as the QoS metric and cost metric, may be received (e.g., retrieved) from the SLA management tool by way of an application programmable interface (API) compatible with the tool. During execution of the application within the cloud-based execution environment, the performance metric of the application may be obtained directly from the application, or captured by a process external to the application.

The method 100 may continue to block 104 with the computer system determining, by an artificial neural network, a mapping between the application and a cloud-based infrastructure utilized by the cloud-based execution environment to execute the application. The artificial neural network utilized may be one previously trained on a knowledge base containing known inputs and outputs for the artificial neural network (e.g., previously observed metrics and the known parameters of the cloud-based execution environment that caused those metrics). The artificial neural network may be a feedforward neural network and may include an input node layer that receives at least the quality-of-service (QoS) metric, the cost metric, and the performance metric of the application. Accordingly, for some examples, the input node layer of the artificial neural network includes at least three input nodes to receive the quality-of-service (QoS) metric, the cost metric, and the performance metric of the application. Depending on the example, the mapping may be implemented as a database table, which may include a one-to-many relationship between a component of the application and a set of cloud-based infrastructures utilized by the cloud-based execution environment. For some examples, the mapping comprises an allocation (e.g., assignment) of a set of virtual machine instances to be utilized by the cloud-based execution environment to execute the application. For instance, for a database server, the mapping may indicate a set of four virtual machine instances be utilized by the cloud-based execution environment executing the database server.

Depending on the example, the mapping may comprise a listing of cloud-based infrastructure components with each cloud-based infrastructure component being associated with an application (e.g., application component) that it will be supporting. For instance, where the application being supported is a payment web service, the mapping may comprise one load balancer and two web servers, each being associated with the web service. In another instance, where the application being supported is an e-mail service, the mapping may comprise one e-mail routing server and three e-mail servers, each being associated with the e-mail service.

The mapping may describe various characteristics regarding a virtual machine instance in the allocated set of virtual machine instances. For instance, the mapping may describe how a particular virtual machine instance in the set of virtual machine instances is to be utilized by the cloud-based execution environment to execute the application. Accordingly, where the mapping indicates that four virtual machine instances are to be utilized by the cloud-based execution environment for executing the database server, the mapping may further indicate that three of the virtual machine instances are to be designated to be primary database servers and one of the virtual machine instances is to be designated to be a secondary (e.g., backup) database server. In another instance, with respect to a particular virtual machine instance in the allocated set of virtual machine instances, the mapping may describe a number of processor cores, amount of memory, a network parameter, or a number logical processors per a network socket.

Depending on the example, determining the mapping by the artificial neural network may comprise basing the mapping on data provided by an output node layer of the artificial neural network. For instance, data from an output node of the artificial neural network may specify a number of virtual machine instances to be utilized by the cloud-based execution environment to execute the application (e.g., web-based application), while another output node of the artificial neural network may specify how a particular virtual machine from the allocated set of virtual machine instances is to be utilized with respect to the application (e.g., primary or secondary). Accordingly, for some examples, the output node layer of the artificial neural network includes at least two output nodes to specify a number of virtual machine instances to be utilized by the cloud-based execution environment to execute the application, and to specify how a particular virtual machine instance from the allocated set of virtual machine instances is to be utilized with respect to the application. Additionally, for some examples, the artificial neural network comprises a single hidden node layer that includes at least seven hidden nodes that facilitate operation of the artificial neural network.

The method 100 may continue to block 106 with the computer system adjusting the cloud-based execution environment based on the mapping. As noted herein, the mapping may be implemented as a database table, which can then be provided to a cloud manager (e.g., elasticity manager) responsible for managing the cloud-based platform (e.g., CLOUD FOUNDRY or Google App Engine) that supports the cloud-based execution environment. In such instances, a database system storing the database table may utilize an application program interface (API) to communicate data from the database table to the cloud manager. The database may, for instance, utilize a Representational State Transfer-based (e.g., RESTful) API call to push data from the database table to the cloud manager. In response to data from the database table, the cloud manager may dynamically allocate or de-allocate virtual machine instances for use by the cloud-based execution environment. Based on the data, the cloud manager may adjust the cloud infrastructure in real-time or on a periodic basis.

The adjustment to the cloud-based execution environment can result in an allocation or de-allocation of cloud-based infrastructure (e.g., allocation or de-allocation of a virtual machine) for use by the cloud-based execution environment. Accordingly, adjustment to the cloud-based execution environment can result in the cloud-based execution environment scaling up or scaling down usage of cloud-based infrastructure to execute the application.

For some examples, adjusting the cloud-based execution environment based on the mapping comprises provisioning, based on the mapping, a new virtual machine instance for use by the cloud-based execution environment to execute the application. For some examples, adjusting the cloud-based execution environment based on the mapping comprises de-provisioning, based on the mapping, an existing virtual machine instance being used by the cloud-based execution environment to execute the application. Further, for some examples, adjusting the cloud-based execution environment based on the mapping comprises re-configuring an existing virtual machine instance being utilized by the cloud-based execution environment to execute the application. Adjustments to the cloud-based execution environment may be logged for subsequent audit, trouble shooting, or use by the artificial neural network.

The method 100 may continue to block 108 with the computer system backpropagating, through the artificial neural network, at least an updated quality-of-service (QoS) metric and an updated cost metric associated with the adjusted cloud-based execution environment. The updated QoS metric and the updated cost metric may be those of the adjusted cloud-based execution environment (e.g., as captured by a service level agreement [SLA] management tool) while it is executing the application. In some examples, backpropagating the updated QoS metric and the updated cost metric through the artificial neural network may comprise determining a first delta between a target (e.g., desired) QoS metric and the updated QoS metric, determining a second delta between a target (e.g., desired) cost metric and the updated cost metric, and backpropagating these deltas through the artificial neural network to adjust weights within the artificial neural network. When backpropagating the deltas through the artificial neural network, a gradient decent search function to attempt to reduce the squared error between the output node layer of the artificial neural network and target metric values.

Figure 2:
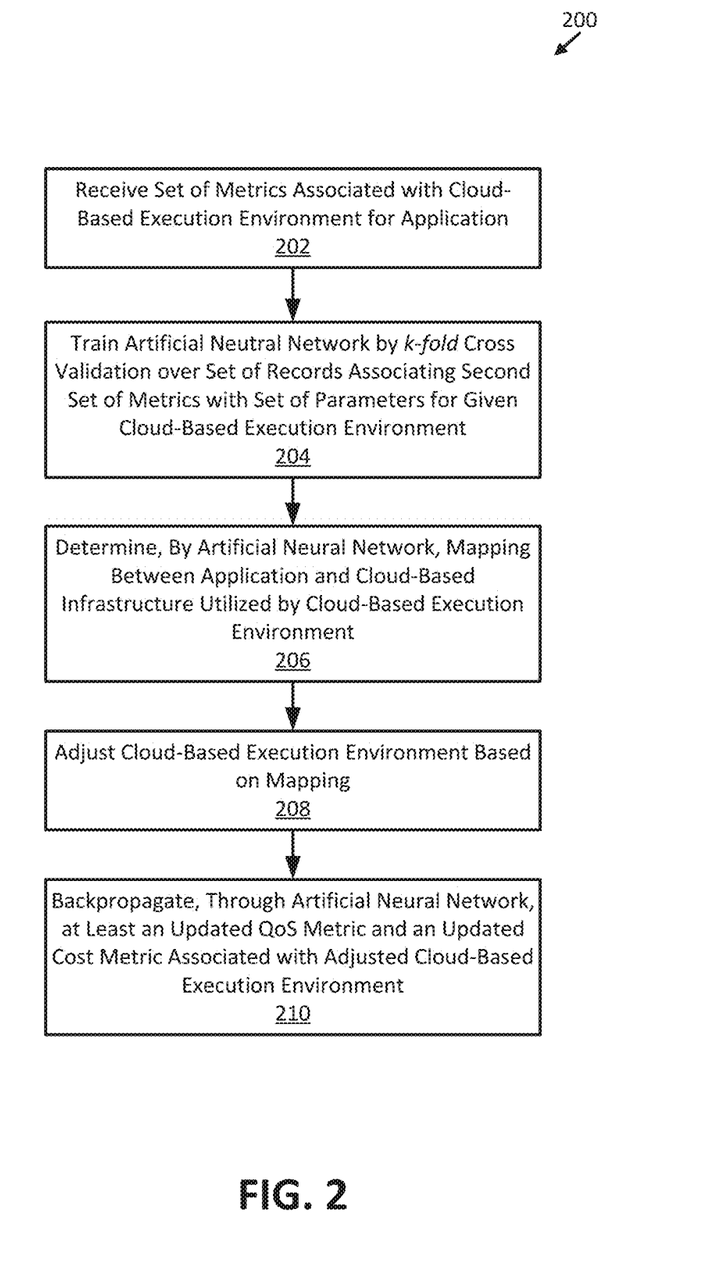

FIG. 2 is a flowchart illustrating an example method 200 for adjusting a cloud-based execution environment according to the present disclosure. For some examples, the method 200 may be one performed with respect to a computer system that can access a set of computer systems implementing, supporting, or managing the cloud-based execution environment. For certain examples, the computer system performing the method 200 may be one that includes or can access a service level agreement (SLA) management tool associated with the cloud-based execution environment. Depending on the example, the method 200 may be implemented in the form of executable instructions stored on a computer-readable medium or in the form of electronic circuitry. For some examples, the operations performed, or the order in which they are performed, may differ from what is illustrated by FIG. 2.

The method 200 may begin at block 202, which may be similar to block 102 of the method 100, with the computer system receiving a set of metrics associated with a cloud-based execution environment for executing an application (e.g., the set of metrics including a QoS metric, a cost metric, and a performance metric of the application), as described above with respect to FIG. 1. The method may continue to block 204 with the computer system training the artificial neutral network by a k-fold cross-validation over a set of records that associate a second set of metrics (e.g., quality-of-service and cost) for a given cloud-based execution environment with a set of parameters for the given cloud-based execution environment. During training of the artificial neural network, data from the second set of metrics can serve as inputs to the artificial neural network and data from the set of parameters of the cloud-based execution environment can serve as targets for the artificial neural network. For each of the records, the second set of metrics may those observed (e.g., recorded) in the past for the given cloud-based execution environment having the corresponding set of parameters of the record and while the given cloud-based execution environment was supporting (e.g., executing) the same application as the one referenced in block 202, or an application similar to the same. The set of parameters for the given cloud-based execution environment can be a configuration of the given cloud-based execution environment while it was supporting (e.g., executing) the same application as the one referenced in block 202, or an application similar to the same. In particular, the set of parameters may specify: a number in of virtual machine instances to be utilized by the given cloud-based execution environment; how each virtual machine instance is to be utilized by the cloud-based execution environment; or a characteristic of each virtual machine utilized by the cloud-based execution environment (e.g., number of processor cores, amount of memory, a network parameter, a number logical processors per a network socket, etc.). For instance, with respect to a web-based application, a record may describe a second set of metrics including a quality-of-service metric of eighty percent availability over a period of time (e.g., a day), describe a cost metric of $0.40 over a period of time (e.g., an hour), and may describe parameters including use of four virtual machine instances as primary web servers to support the web-based application.

The set of records utilized to train the artificial network can represent a knowledge base generated or collected (e.g., over time through monitoring activities). For instance, the set of records may be generated by monitoring (e.g., over certain period of times) metrics (e.g., cost and quality-of-service) and parameters (e.g., number of virtual servers, and how they are being used) of different cloud-based execution environments, which may be supporting (e.g., executing) different types of applications.

According to some examples, the k-fold cross-validation involves at least three sets of records: a first set of records to train the artificial neural network; a second set of records to validate the training of the artificial neural network; and a third set of records to address overfilling of the artificial neural network (e.g., to find a global minimum for the artificial neural network). Though the first, second, and third sets of records are utilized for different training purposes, the records between the sets may be similar (e.g., in structure and content). In particular, the first set of records can drive the gradient descent search function during training of the artificial neural network. During validation, the difference (e.g., error) between output layer data from the artificial neural network and the data in the second set of the records can be monitored. The third set of records can facilitate the decreasing of weights within the artificial neural network to find a global minimum for the artificial neural network.

The method 200 may continue to blocks 206, 208, and 210, which are respectively similar to blocks 104, 106, and 108 of the method 100 as described above with respect to FIG. 1.

Figure 3:
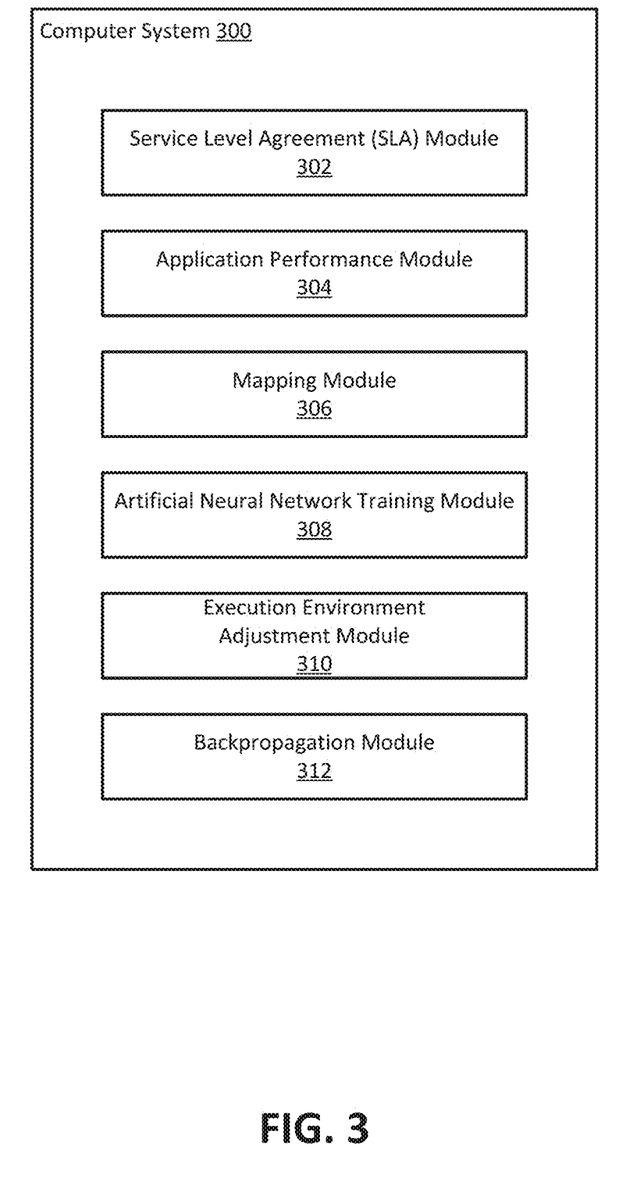
FIGS. 3 and 4 are block diagrams illustrating example computer systems for adjusting a cloud-based execution environment according to the present disclosure.

FIG. 3 is a block diagram illustrating an example computer system 300 for adjusting a cloud-based execution environment according to the present disclosure. As described herein, the computer system 300 can include, without limitation, a desktop, a server, a mobile computing device, or any other suitable computing device. In FIG. 3, the computer system 300 as illustrated includes a service level agreement (SLA) module 302, an application performance module 304, a mapping module 306, an artificial neural network training module 308, an execution environment adjustment module 310, and a backpropagation module 312. In various examples, the components or the arrangement of components in the computer system 300 may differ from what is depicted in FIG. 3.

As used herein, modules and other components of various examples may comprise, in whole or in part, may be any combination of hardware and programming to implement the functionalities of the modules described herein. In examples described herein, such combinations of hardware and programming may be implemented in a number of different ways. For example, the programming for the modules may be processor executable instructions stored on at least one non-transitory machine-readable storage medium and the hardware for the modules may include at least one processing resource to execute those instructions. In such examples, the at least one machine-readable storage medium may store instructions that, when executed by the at least one processing resource, implement the modules of the computer system 300. In some examples, the hardware and programming implementing modules 302, 304, 306, 308 and 310 may be divided among multiple computing devices.

The service level agreement (SLA) module 302 may facilitate obtaining from a SLA management tool a set of metrics associated with a cloud-based execution environment for executing an application, where the set of metrics includes a quality-of-service (QoS) metric and a cost metric. As noted herein, the SLA management tool may be associated with the cloud-based execution environment.

The application performance module 304 may facilitate obtaining performance metrics of the application. As noted herein, the performance metric of the application may be obtained directly from the application or, alternatively, captured by a process external to the application (e.g., service level agreement [SLA] management tool) and subsequently retrieved from the process.

The mapping module 306 may facilitate determining, based on an artificial neural network, a mapping between the application and a cloud-based infrastructure utilized by the cloud-based execution environment to execute the application. As noted herein, the artificial neural network may include an input node layer that receives at least the QoS metric, the cost metric, and the performance metric. Additionally, the mapping may be implemented as a database table, which may include a one-to-many relationship between a component of the application and a set of cloud-based infrastructures utilized by the cloud-based execution environment.

The artificial neural network training module 308 may facilitate training the artificial neutral network by a k-fold cross-validation over a set of records that associate a second set of metrics for a given cloud-based execution environment with a set of parameters for the given cloud-based execution environment. As noted herein, the k-fold cross-validation can involve at least three sets of records: a first set of records to train the artificial neural network; a second set of records to validate the training of the artificial neural network; and a third set of records to address overfitting of the artificial neural network (e.g., to find a global minimum for the artificial neural network).

The execution environment adjustment module 310 may facilitate adjusting the cloud-based execution environment based on the mapping. As noted herein, the adjustment to the cloud-based execution environment can result in an allocation or de-allocation of cloud-based infrastructure for use by the cloud-based execution environment, or result in re-configuration of an existing virtual machine instance being utilized by the cloud-based execution environment to execute the application.

The backpropagation module 312 may facilitate backpropagating, through the artificial neural network, at least an updated QoS metric and an updated cost metric associated with the adjusted cloud-based execution environment. As discussed herein with respect to block 108 of the method 100, backpropagating the updated QoS metric and the updated cost metric through the artificial neural network may comprise determining a first delta between a target (e.g., desired) QoS metric and the updated QoS metric, determining a second delta between a target (e.g., desired) cost metric and the updated cost metric, and backpropagating these deltas through the artificial neural network to adjust weights within the artificial neural network.

Figure 4:
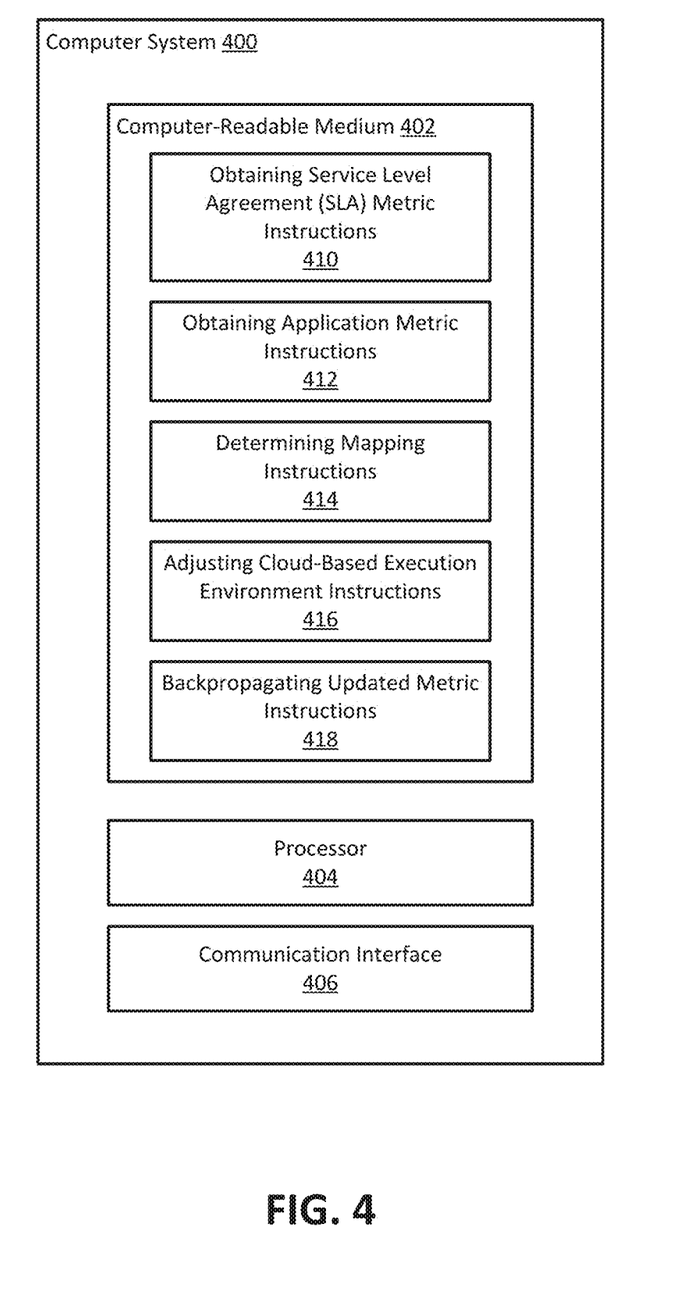

FIG. 4 is a diagram illustrating an example computer system 400 for adjusting a cloud-based execution environment according to the present disclosure. As shown in FIG. 4, the computer system 400 includes a computer-readable medium 402, a processor 404, and a communication interface 406. In various examples, the components or the arrangement of components of the computer system 400 may differ from what is depicted in FIG. 4. For instance, the computer system 400 can include more or less components than those depicted in FIG. 4.

The computer-readable medium 402 may be any electronic, magnetic, optical, or other physical storage device that stores executable instructions. For example, the computer-readable medium 402 may be a Random Access Memory (RAM), an Electrically-Erasable Programmable Read-Only Memory (EEPROM), a storage drive, an optical disc, or the like. The computer-readable medium 402 can be encoded to store executable instructions that cause the processor 404 to perform operations in accordance with various examples described herein. In various examples, the computer-readable medium 402 is non-transitory. As shown in FIG. 4, the computer-readable medium 402 includes obtaining service level agreement (SLA) metric instructions 410, obtaining application metric instructions 412, determining mapping instructions 414, adjusting cloud-based execution environment instructions 416, and backpropagating updated metric instructions 418.

The processor 404 may be one or more central processing units (CPUs), microprocessors, or other hardware devices suitable for retrieval and execution of one or more instructions stored in the computer-readable medium 402. The processor 404 may fetch, decode, and execute the instructions 410, 412, 414, 416, and 418 to enable the computer system 400 to perform operations in accordance with various examples described herein. For some examples, the processor 404 includes one or more electronic circuits comprising a number of electronic components for performing the functionality of one or more of the instructions 410, 412, 414, 416, and 418.

The obtaining SLA metric instructions 410 may cause the processor 404 to obtain, from a SLA management tool, a set of metrics associated with a cloud-based execution environment a set of metrics associated with a cloud-based execution environment for executing an application, where the set of metrics includes at least a quality-of-service (QoS) metric and a cost metric. As noted herein, the SLA management tool may be associated with (e.g., manage) the cloud-based execution environment.

The obtaining application metric instructions 412 may cause the processor 404 to obtain a performance metric of the application. The determining mapping instructions 414 may cause the processor 404 to determine, by an artificial neural network, a mapping between the application and a cloud-based infrastructure utilized by the cloud-based execution environment to execute the application. As noted herein, the artificial neural network may include an input node layer that receives at least the quality-of-service (QoS) metric, the cost metric, and the performance metric.

The adjusting cloud-based execution environment instructions 416 may cause the processor 404 to adjust the cloud-based execution environment based on the mapping. For instance, based on the mapping indicating less virtual machine instances are to be mapped to the application (e.g., web service), a set of four virtual machine instances presently allocated for use by the cloud-based execution environment may be reduced to two virtual machine instances, and both of the two virtual machine instances may be designated to be primary support for the cloud-based execution environment.

The backpropagating updated metric instructions 418 may cause the processor 404 to backpropagate, through the artificial neural network, at least an updated QoS metric and an updated cost metric associated with the adjusted cloud-based execution environment. As discussed herein with respect to block 108 of the method 100, the updated QoS metric and the updated cost metric may be those of the adjusted cloud-based execution environment (e.g., as captured by a service level agreement [SLA] management tool) while it is executing the application.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A method, comprising:
   receiving, at a computer system, a set of metrics associated with a cloud-based execution environment for executing an application, the set of metrics including a quality-of-service (QoS) metric, a cost metric, and a performance metric of the application;
   determining, by an artificial neural network, a mapping between the application and a cloud-based infrastructure utilized by the cloud-based execution environment to execute the application, by an input node layer of the artificial neural network receiving at least the QoS metric, the cost metric and the performance metric of the application, wherein the mapping identifies a number of virtual machine instances for executing the application, a characteristic of the virtual machine instances, and a manner in which the virtual machine instances are to be utilized by the cloud-based execution environment in order to improve compliance of execution of the application by the cloud-based execution environment with the set of metrics;
   adjusting the cloud-based execution environment based on the mapping; and
   backpropagating, through the artificial neural network, at least an updated QoS metric and an updated cost metric associated with the adjusted cloud-based execution environment.

2. The method of claim 1, wherein the mapping comprises an allocation of a set of the number of virtual machine instances to be utilized by the cloud-based execution environment to execute the application.

3. The method of claim 2, wherein the mapping describes a particular role a particular virtual machine instance in the set of virtual machine instances is to serve in the cloud-based execution environment to execute the application.

4. The method of claim 2, wherein with respect to a particular virtual machine instance in the set of virtual machine instances, the mapping describes a number of processor cores, amount of memory, a network parameter, or a number logical processors per a network socket.

5. The method of claim 1, wherein the QoS metric is provided by a service-level agreement (SLA) management tool associated with the cloud-based execution environment.

6. The method of claim 1, wherein the cost metric is provided by a service-level agreement (SLA) management tool associated with the cloud-based execution environment.

7. The method of claim 1, wherein the performance metric of the application includes a response time associated with the application, a queue length associated with the application, or computer-resource utilization by the application as the application executes within the cloud-based execution environment.

8. The method of claim 1, wherein adjusting the cloud-based execution environment based on the mapping comprises provisioning a virtual machine instance for use by the cloud-based execution environment to execute the application, or de-provisioning a virtual machine instance being used by the cloud-based execution environment to execute the application, the provisioning or the de-provisioning being based on the mapping.

9. The method of claim 1, wherein adjusting the cloud-based execution environment based on the mapping comprises re-configuring an existing virtual machine instance being utilized by the cloud-based execution environment to execute the application.

10. The method of claim 1, comprising training the artificial neural network by a k-fold cross-validation over a set of records that associate a second set of metrics for a given cloud-based execution environment with a set of parameters for the given cloud-based execution environment.

11. The system of claim 1, wherein the updated QoS metric represents a difference between the QoS metric and a QoS metric obtained from the adjusted cloud-based execution environment by an SLA management tool associated with the cloud-based execution environment and the updated cost metric represents a difference between the cost metric and a cost metric obtained from the adjusted cloud-based execution environment by the SLA management tool.

12. A computer system, comprising:
   a memory that stores a specification describing a quality of service (QoS) parameter and a priority level for individual workloads of server systems;
   a processing resource; and
   a non-transitory computer-readable medium, coupled to the processing resource, having stored therein instructions that when executed by the processing resource cause the processing resource to:
   obtain from a service level agreement (SLA) management tool a set of metrics associated with a cloud-based execution environment for executing an application, the SLA management tool being associated with the cloud-based execution environment, and the set of metrics including a quality-of-service (QoS) metric and a cost metric;
   obtain performance metrics of the application;
   determine, based on an artificial neural network, a mapping between the application and a cloud-based infrastructure utilized by the cloud-based execution environment to execute the application, an input node layer of the artificial neural network receiving at least the QoS metric, the cost metric, and the performance metric, wherein the mapping identifies a number of virtual machine instances for executing the application, a characteristic of the virtual machine instances, and a manner in which the virtual machine instances are to be utilized by the cloud-based execution environment in order to improve compliance of execution of the application by the cloud-based execution environment with the set of metrics;
   train the artificial neural network by a k-fold cross-validation over a set of records that associate a second set of metrics for a given cloud-based execution environment with a set of parameters for the given cloud-based execution environment;
   adjust the cloud-based execution environment based on the mapping; and
   backpropagate, through the artificial neural network, at least an updated QoS metric and an updated cost metric associated with the adjusted cloud-based execution environment.

13. The system of claim 12, wherein adjusting the cloud-based execution environment based on the mapping comprises re-configuring an existing virtual machine instance being utilized by the cloud-based execution environment to execute the application.

14. The system of claim 12, wherein adjusting the cloud-based execution environment based on the mapping comprises provisioning, based on the mapping, a new virtual machine instance for use by the cloud-based execution environment to execute the application, or de-provisioning, based on the mapping, an existing virtual machine instance being used by the cloud-based execution environment to execute the application.

15. A non-transitory computer readable medium having instructions stored thereon, the instructions being executable by a processor of a computer system, the instructions causing the processor to:
obtain, from a SLA management tool, a set of metrics associated with a cloud-based execution environment a set of metrics associated with a cloud-based execution environment for executing an application, the SLA management tool being associated with the cloud-based execution environment, and the set of metrics including a quality-of-service (QoS) metric and a cost metric;
obtain a performance metric of the application;
determine, by an artificial neural network, a mapping between the application and a cloud-based infrastructure utilized by the cloud-based execution environment to execute the application, an input node layer of the artificial neural network receiving at least the QoS metric, the cost metric, and the performance metric, wherein the mapping identifies a number of virtual machine instances for executing the application, a characteristic of the virtual machine instances, and a manner in which the virtual machine instances are to be utilized by the cloud-based execution environment in order to improve compliance of execution of the application by the cloud-based execution environment with the set of metrics;
adjust the cloud-based execution environment based on the mapping; and
backpropagate, through the artificial neural network, at least an updated QoS metric and an updated cost metric associated with the adjusted cloud-based execution environment.

16. The non-transitory computer readable medium of claim 15, wherein the instructions cause the processor to train the artificial neural network by a k-fold cross-validation over a set of records that associate a second set of metrics for a given cloud-based execution environment with a set of parameters for the given cloud-based execution environment.

17. The non-transitory computer readable medium of claim 15, wherein the mapping comprises an allocation of a set of the number of virtual machine instances to be utilized by the cloud-based execution environment to execute the application.

18. The non-transitory computer readable medium of claim 15, wherein the mapping describes a particular role a particular virtual machine instance in the set of virtual machine instances is to serve in the cloud-based execution environment to execute the application.

19. The non-transitory computer readable medium of claim 15, wherein with respect to a particular virtual machine instance in the set of virtual machine instances, the mapping describes a number of processor cores, amount of memory, a network parameter, or a number logical processors per a network socket.

20. The non-transitory computer readable medium of claim 15, wherein the updated QoS metric represents a difference between the QoS metric and a QoS metric obtained from the adjusted cloud-based execution environment by an SLA management tool associated with the cloud-based execution environment and the updated cost metric represents a difference between the cost metric and a cost metric obtained from the adjusted cloud-based execution environment by the SLA management tool.

* * * * *